United States Patent [19]

Kukkal et al.

[11] Patent Number: 5,737,530
[45] Date of Patent: Apr. 7, 1998

[54] METHOD AND APPARATUS FOR CONDITIONALLY TERMINATING A PERSONAL COMPUTER CONFERENCE

[75] Inventors: Puneet Kukkal, Hillsboro; Sridhar Iyengar; Dale Boss, both of Beaverton, all of Oreg.

[73] Assignee: Intel Corporation, Santa Clara, Calif.

[21] Appl. No.: 535,630

[22] Filed: Sep. 28, 1995

[51] Int. Cl.⁶ .................................................. G06F 3/00
[52] U.S. Cl. .......................... 395/200.34; 345/330
[58] Field of Search ........................ 395/326–358, 395/200.04, 200.01, 200.11, 200.3, 200.34–200.37, 200.53–200.56; 379/202–206; 463/42

[56] References Cited

U.S. PATENT DOCUMENTS

| | | | |
|---|---|---|---|
| 5,195,086 | 3/1993 | Baumgartner | 395/332 X |
| 5,392,400 | 2/1995 | Berkowitz et al. | 395/200.04 |
| 5,491,743 | 2/1996 | Shiio et al. | 395/332 X |
| 5,508,713 | 4/1996 | Okouchi | 395/332 X |
| 5,539,886 | 7/1996 | Aldred et al. | 395/200.04 |
| 5,600,797 | 2/1997 | Marshall | 395/200.11 |
| 5,640,540 | 6/1997 | Ansberry et al. | 395/200.04 X |

*Primary Examiner*—John E. Breene
*Attorney, Agent, or Firm*—Blakely, Sokoloff, Taylor & Zafman

[57] ABSTRACT

The conference manager of a conferencing application is enhanced to provide conditional termination service. In response to the receipt of a conference termination request, the conference manager provides cooperative applications as well as other connection dependent conferencing systems joined to the conference in progress opportunities to object to the conference termination request. If objections were received, the conference manager further provides a user of the conferencing system an opportunity to provide his/her inputs on whether the objections are to be overridden or sustained.

20 Claims, 8 Drawing Sheets

METHOD AND APPARATUS FOR CONDITIONALLY TERMINATING A PERSONAL COMPUTER CONFERENCE

BACKGROUND OF THE INVENTION

1. Field of the Invention

The present invention relates to the field of personal computer (PC) conferencing. More specifically, the present invention relates to the termination of a PC conference.

2. Background Information

PC data and/or video conferencing is known in the art. Typically, under the prior art, when the conference manager of a conferencing application receives a request to terminate a conference, the conference manager would unconditionally "tear down" the connection and terminate the conference. This unconditional approach has worked fine when PC conferencing technology was at its early stages, and conferencing applications were used in a relatively straight forward manner, i.e., PC conference was typically point-to-point, and there were no cooperative applications having inter-dependency on the conferencing application being used at the same time.

However, as conferencing application and related technology continues to advance, such as application sharing (see U.S. patent application, Ser. No. 08/261,740) and multi-point control, increasingly conferencing applications are being used in conjunction with other cooperative and/or for multi-point conferences. For certain cooperative and/or multi-point applications such as financial services applications, orderly shut down of a conference to prevent accidental loss of data or data getting out of sync is of utmost importance.

Thus, it is desirable to have an improved approach to the termination of PC data and/or video conference. As will be disclosed in more detail below, the present invention achieves these and other desired results.

SUMMARY OF THE INVENTION

The conference manager of a conferencing application is enhanced to provide conditional termination service. In response to a request for termination, the conference manager notifies all cooperative applications of the termination request. If the termination request was generated locally, and there is at least one connection dependent conferencing system, the conference manager further notifies each of the connection dependent conferencing system. Upon provision of the notifications, the conference manager sets a timer. The timer is set to expire at the elapse of a first predetermined time interval, unless the conference manager is the originator of the termination request, in which case the timer is set to expire at the elapse of a second predetermined time interval, a longer time interval.

In a complementary manner, the cooperative applications are enhanced to reply to the conference manager as to whether it is okay with the applications to actually go through with the termination.

Additionally, the conference manager is further enhanced to provide the user of the PC conferencing system with a choice as to whether to proceed with the termination anyway, notwithstanding the "objections" of one or more of the cooperative applications and/or connection dependent conferencing systems, or to "cancel" the pending termination request, upon receipt of one or more "negative" responses to the termination request. If at least one "objection" is received, the conference manager goes through with the termination only upon positive confirmation from the user.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1A:
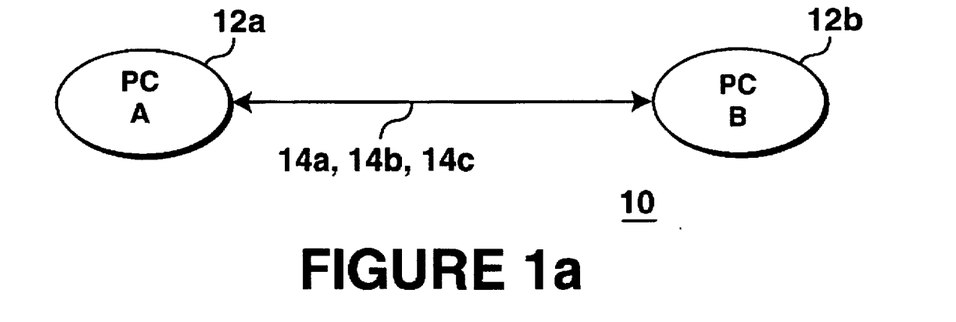
FIG. 1a–1c illustrate exemplary point-to-point and multi-point PC conferences incorporating the teachings of the present invention.
Figure 1B:
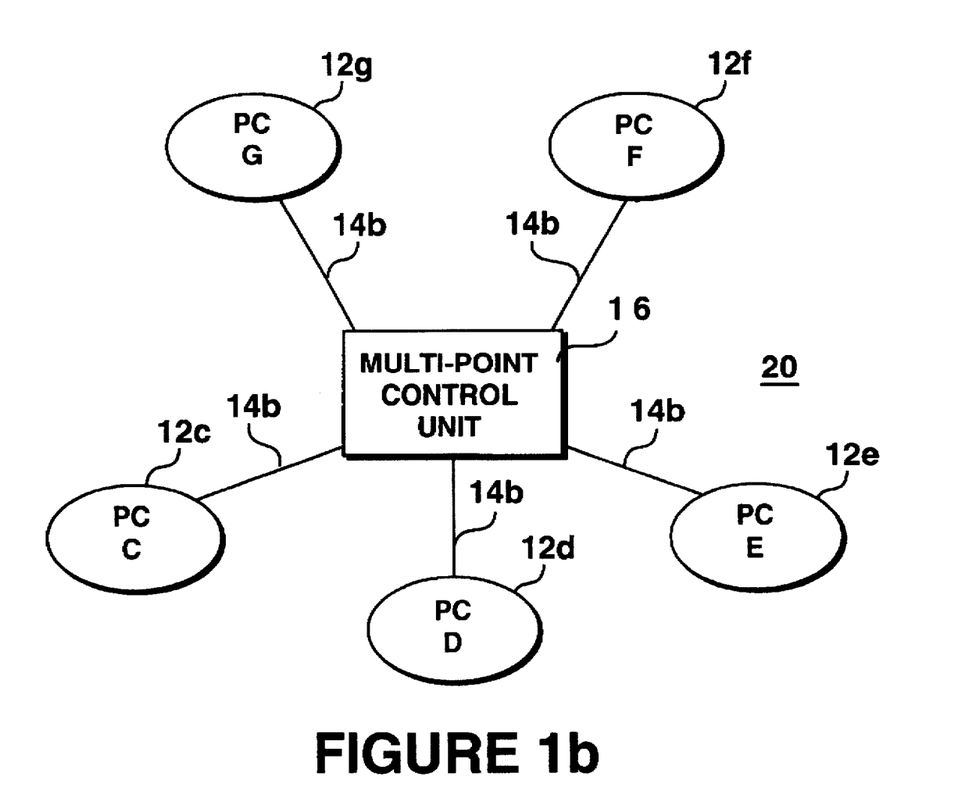
Figure 1C:
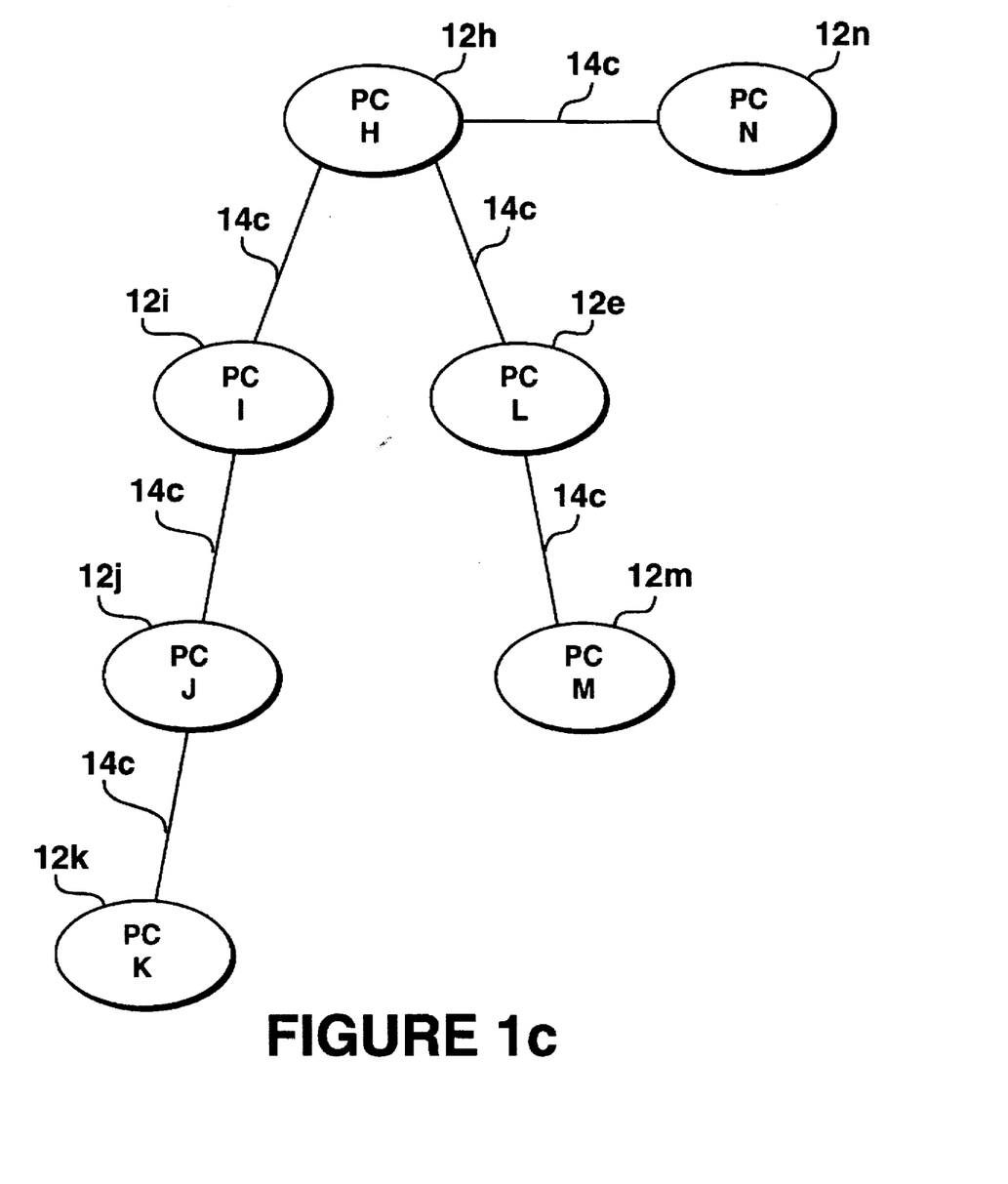

Referring now to FIGS. 1a–1c, three exemplary networks of PC conferencing systems incorporated with the teachings of the present invention are illustrated. FIG. 1a illustrates an exemplary point-to-point PC conferencing system 10. FIG. 1b illustrates an exemplary multi-point PC conferencing system 20a in a "star" topology, whereas FIG. 1c illustrates an exemplary multi-point PC conferencing system 20b in an hierarchical topology. Point-to-point PC conferencing system 10 comprises PC A & B 12a and 12b connected to each other via POTS, ISDN or LAN 14a–14c. Multi-point PC conferencing systems 20a comprises PC C-G 12c–12g and multi-point control unit (MCU) 16 connected to each other via ISDN 14b, whereas multi-point PC conferencing systems 20b comprises PC H-N 12h–12n connected to each other via LAN 14c. PC A 12a and PC B 12b are joined together in conference when one of the two PC's 12a or 12b call the other. PC C-G 12c–12g are joined together in conference via MCU 16 when PC's 12c–12g individually call MCU 16. PC H-N 12h–12n are joined together in conference when PC's 12h–12n individually call their respectively preceding/succeeding PC's 12h–12n.

While for ease of explanation, exemplary multi-point PC conferencing system 20a is illustrated with all PC C-G 12c–12g joined in conference via one MCU 16, based on the description to follow, it will be appreciated that the present invention may be practiced with multi-point PC conferencing system 20a employing one or more MCU's 16. Furthermore, MCU 16 may be managing multiple independent multi-point PC conferences.

PC A-N 12a–12n and MCU 16 are all equipped with relative high performance processors having sufficient computing power for processing digitized audio and video data in real time. Additionally, each of PC A-N 12a–12n and MCU 16 is also equipped with communication interface(s) and storage medium. PC A-N 12a–12n are further equipped with audio/video subsystems. Communication interfaces, storage medium, and audio/video subsystems may be implemented with any number of such elements well known in the art.

MCU 16 is equipped with multi-point control software having capabilities similar to MCUs employed in AT&T's WorldWorx<sup>SM</sup> service provided by AT&T of New Jersey. PC A-N 12a–12n are all equipped with substantially identical conferencing applications incorporated with teachings of the present invention. Each conferencing application includes base conferencing functions similar to those offered by the ProShare™ Personal Conferencing System manufactured by the assignee of the present invention. Each conferencing application also includes the condition termination service of the present invention, to be described more fully below. For a more detail description of AT&T's WorldWorx<sup>SM</sup> service and ProShare™, refer to their respective product literature's.

Figure 2:
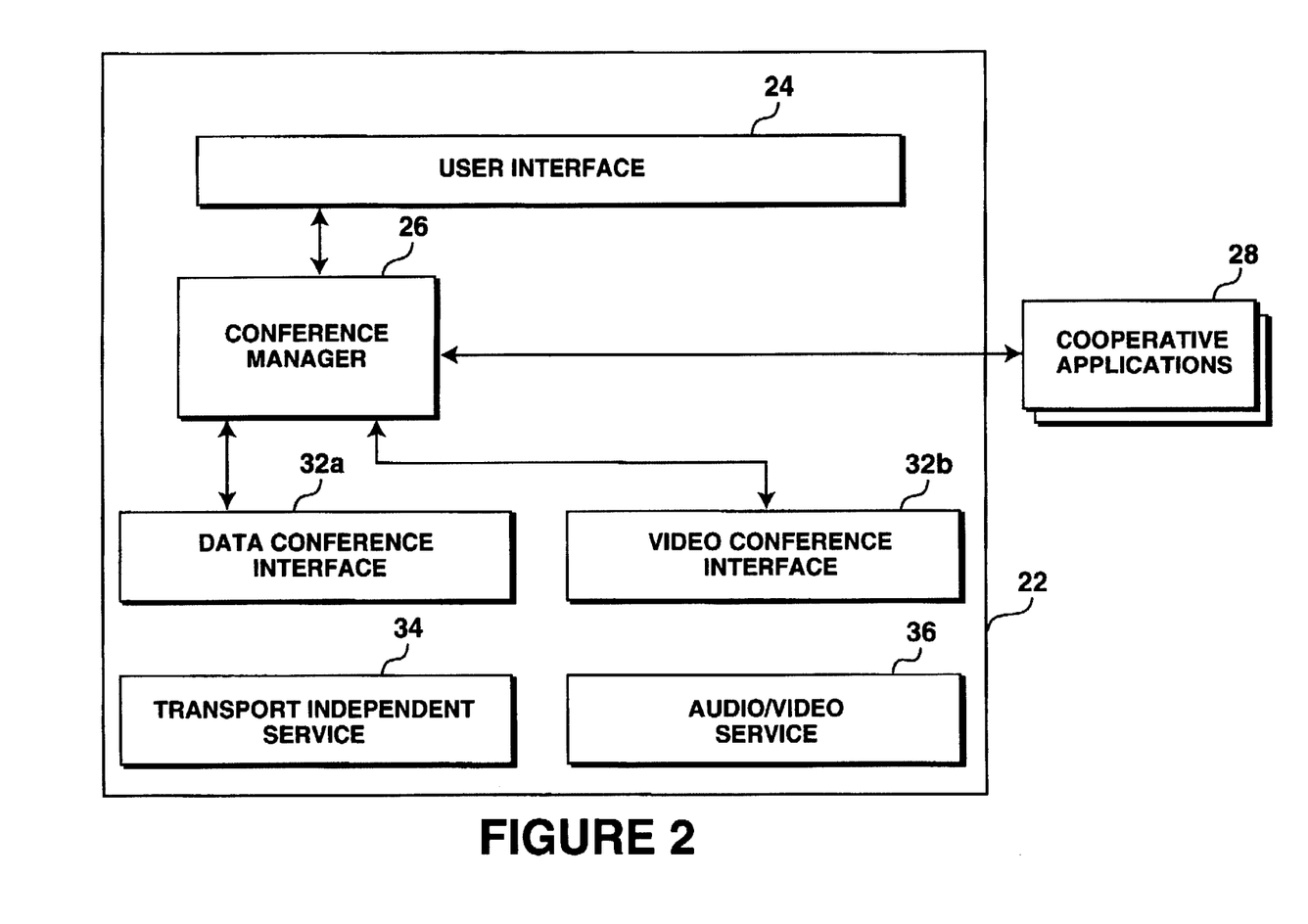
FIG. 2 illustrates one embodiment of a conferencing application incorporated in each of the PC's of FIG. 1a–1c.

FIG. 2 illustrates one embodiment of a conferencing application incorporated with the teachings of the present invention in further detail. As shown, for this embodiment, conferencing application 22 comprises user interface 24, conference manager 26, transport independent services 34, extended A/V services 36, and "integrated" data and video conference interfaces 32a–32b to these services 34 and 36. Additionally, conferencing application 22 cooperates with one or more cooperative applications 28. In the presently preferred embodiment, conferencing application 22 and cooperative applications 28 are implemented in an object-oriented manner using the programming language C++.

User interface 24 provides display windows with menus, buttons etc. for interacting with a user. In particular, in accordance to the present invention, user interface 24 includes a confirmation dialog box for overriding objections to a termination request or aborting a termination request. Conference manager 26 manages personal conferences. In particular, conference manager 26 includes the conditional termination service of the present invention. Associated with the conditional termination service is a data structure for storing reasons for objecting to a pending termination request. Cooperative applications 28 provide application services to the user, leveraging the data and/or video conferencing capabilities of conferencing application 22. In accordance to the present invention, cooperative applications 28 are equipped to reply to a notification of a pending termination request from conferencing application 22. The conditional termination service, including notifications and replies between the conferencing systems and intra-system, i.e. between conferencing application 22 and cooperative applications 28, will be described in further detail below.

Transport independent services 34 provide connection services on multiple transport media and multiple connections. A/V services 36 provide sampling, digitization, compression/decompression of audio signals exchanged, as well as capture and playback services for video streams including interfacing with the proper CODEC to compress and decompress the video signals. Integrated data and video conference interfaces 32a–32b provide abstraction of these transport and A/V services, enabling the serviced application to perform call management, data and/or file channel management, and A/V streams management. In one embodiment, "integrated" data conference interface 32a supports ITU's T.120 protocol, whereas "integrated video conference interface 32b supports ITU's H.320 protocol. These and other related services are known in the art, and therefore will not be described in further detail.

FIGS. 3a–3e illustrate the method steps of the present invention for conditionally terminating a PC conference. For ease of understanding, some of the method steps are described using multiple steps, however the sequential presentation of these steps should not be construed to mean that the steps are necessarily order dependent.

Figure 3A:
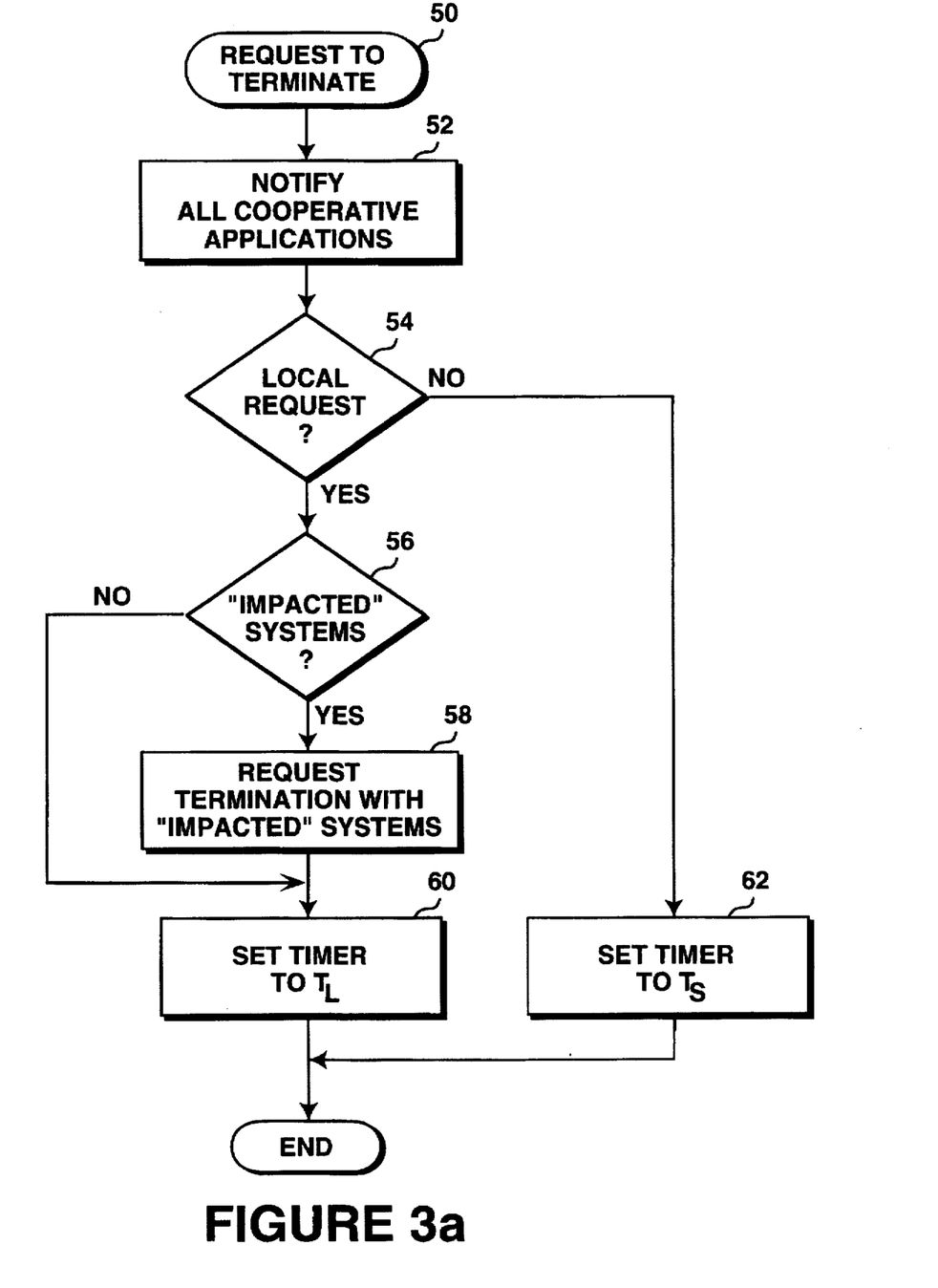
FIGS. 3a–3e illustrate the method steps of the present invention for conditionally terminating a PC conference.

As shown in FIG. 3a, in response to the receipt of a request to terminate a conference, step 50, conference manager 26 notifies all cooperative applications 28 on its system, step 52. Additionally, conference manager 26 determines if the request is initiated by the local user or a local cooperative application, step 54, if the request to terminate is initiated by another system joined to the conference (i.e. a system on which the conference manager is dependent on for its connection), conference manager 26 proceeds and sets a timer to expire at the elapse of a first predetermined time period $(T_s)$, step 62.

On the other hand, if the request to terminate is initiated by the local user or by a local cooperative application 28, conference manager 26 further determines if there are any conferencing systems going to be impacted by its disconnection, step 56. In other words, whether there are any conferencing systems whose connections are dependent on the terminating conferencing system. If there is at least one connection dependent conferencing system, conference manager 26 requests termination with each of the "impacted" systems, step 58. If there are no "impacted" conferencing system, or upon making the termination request(s), conference manager 26 sets a timer to expire at the elapse of a second predetermined time period $(T_L)$, which is a longer time period than $T_s$, step 60.

Figure 3B:
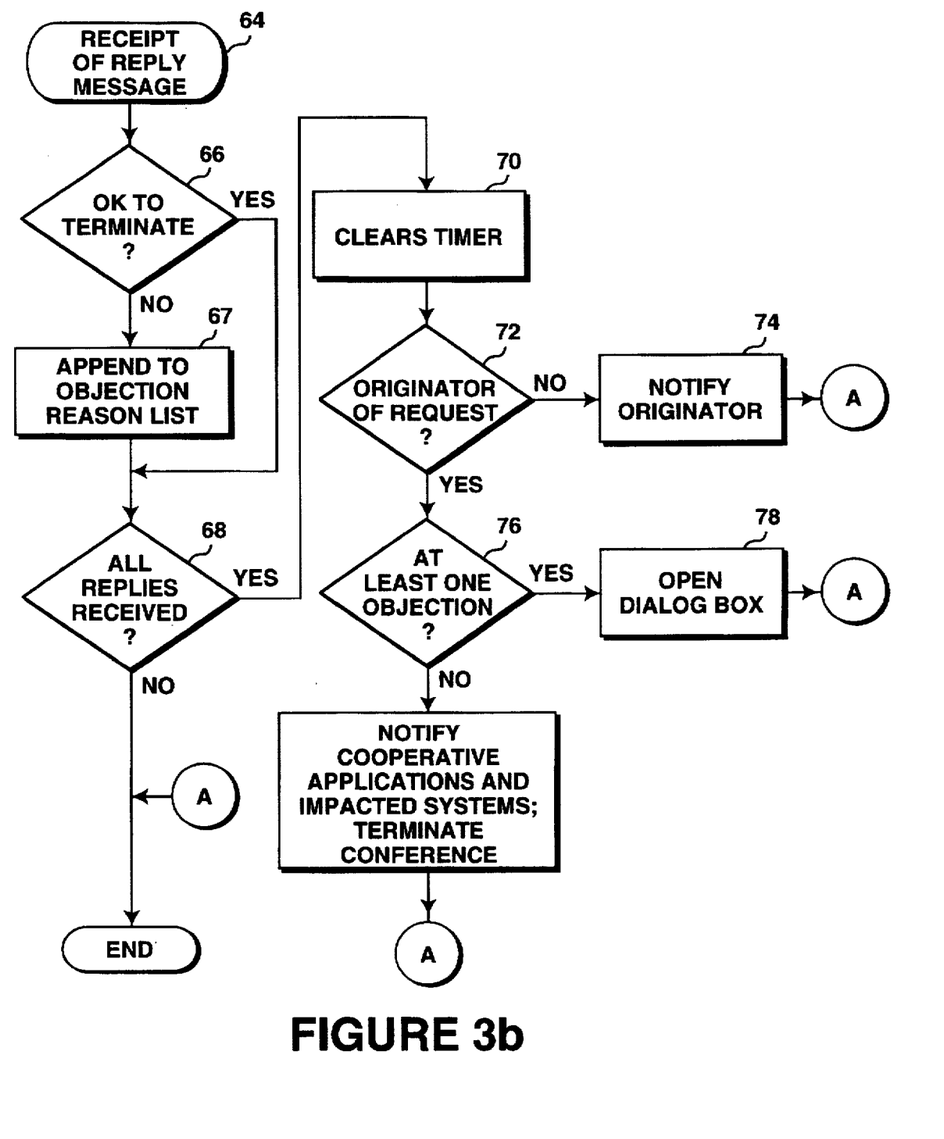

As shown in FIG. 3b, upon receipt of a termination reply message, step 64, conference manager 26 determines if the reply message denotes whether it is okay to proceed with the termination request or the termination request is "objected to", step 66. In one embodiment, a null reply message denotes it is okay to proceed with the termination request, otherwise the reply message includes the objection reason. If it is determined at step 66 that the termination request is objected to, conference manager 26 appends the objection reason to the end of the objection reason list described earlier, step 67. On the other hand, it is okay to proceed with the termination request, or upon appending the objection reason, conference manager 26 checks to determine if all expected replies have been received. For example, for a personal conferencing application having three cooperative applications, conferencing manager 26 checks to determine if it has received all three replies. On the other hand, for a personal conferencing application having two connection dependent conferencing systems and two cooperative applications, conference manager 26 checks to determine if its has received all four replies.

If not all expected replies have been received, conference manager 26 takes no further action. On the other hand, if all expected replies have been received, step 68, conference manager 26 clears the timer it set, step 70. Next, conference manager 26 determines if it is the originator of the termination request, step 72. If it is not the originator of the request, conference manager 26 notifies the requester, step 74.

If it is the originator of the request, conference manager 26 further determines if it has received at least one objection to termination, step 76 the termination request is objected to, conference manager 26 append the objection reason to the end of the objection reason list described earlier, step 76. If it did, it opens the dialog confirmation box, step 78; otherwise it notifies all cooperative applications (if any[1]) and "impacted" systems (if any[2]), and then terminates its connection to the conference, step 80.

[1] Applications objected to the termination, and/or applications approved the termination but elected not to terminate yet.
[2] Impacted systems objected to the termination, and/or impacted systems approved the termination but elected not to terminate yet.

Figure 3C:
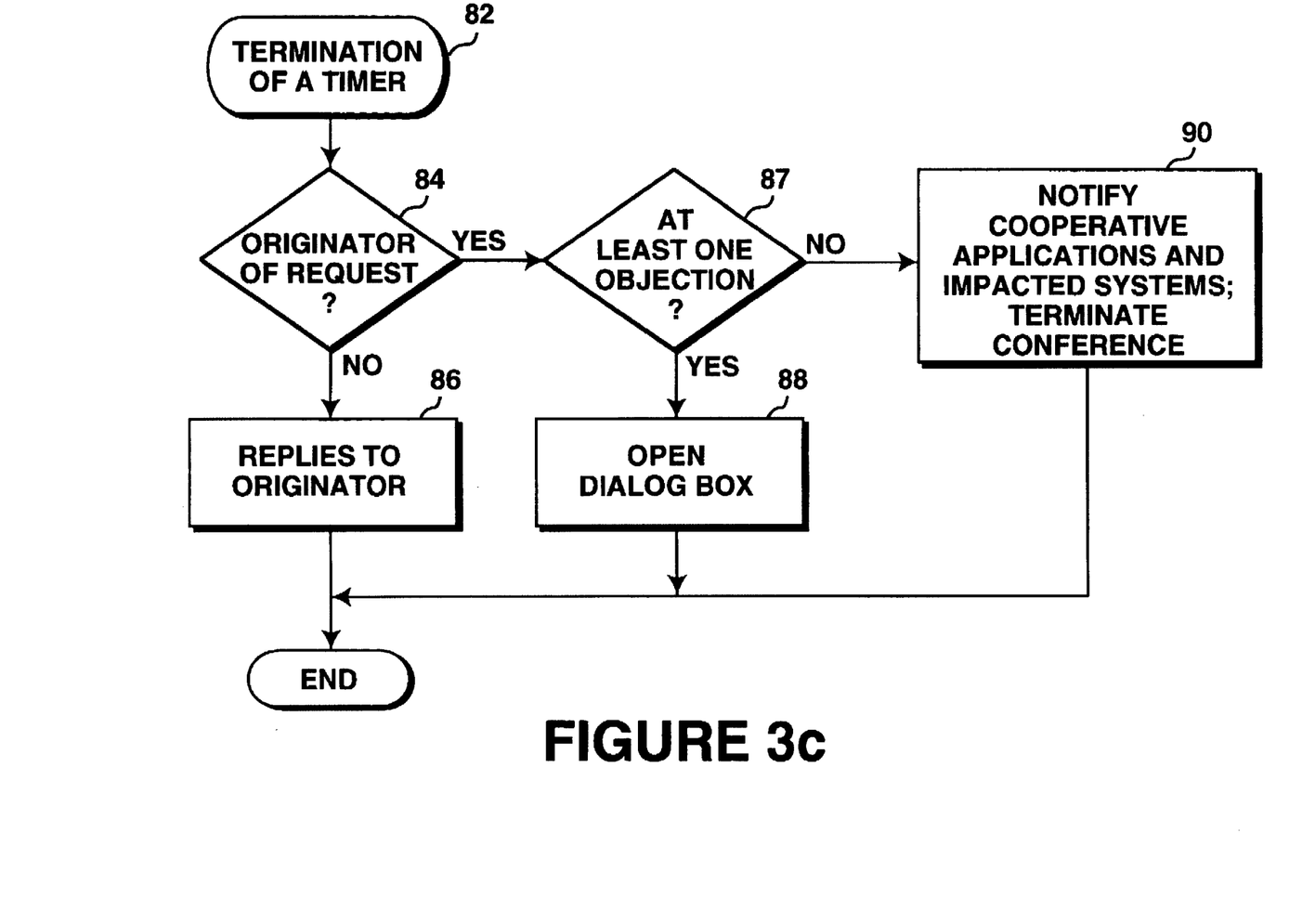

As shown in FIG. 3c, upon termination of a timer, step 82, conference manager 26 determines if it is the originator of the request, step 84. If it is the not originator of the request, conference manager 26 replies to the request originator, based on the replies it received if at least one reply has been received from the cooperative applications, step 86. If it is the originator of the termination request, step 84, conference manager 26 further determines if it has received at least one objection, step 87. If it has at least one objection, conference manager 26 opens the termination confirmation dialog box, step 88, otherwise, conference manager 26 notifies all cooperative applications (if any) and "impacted" systems (if any), and then terminates its connection to the conference, step 90.

Figure 3D:
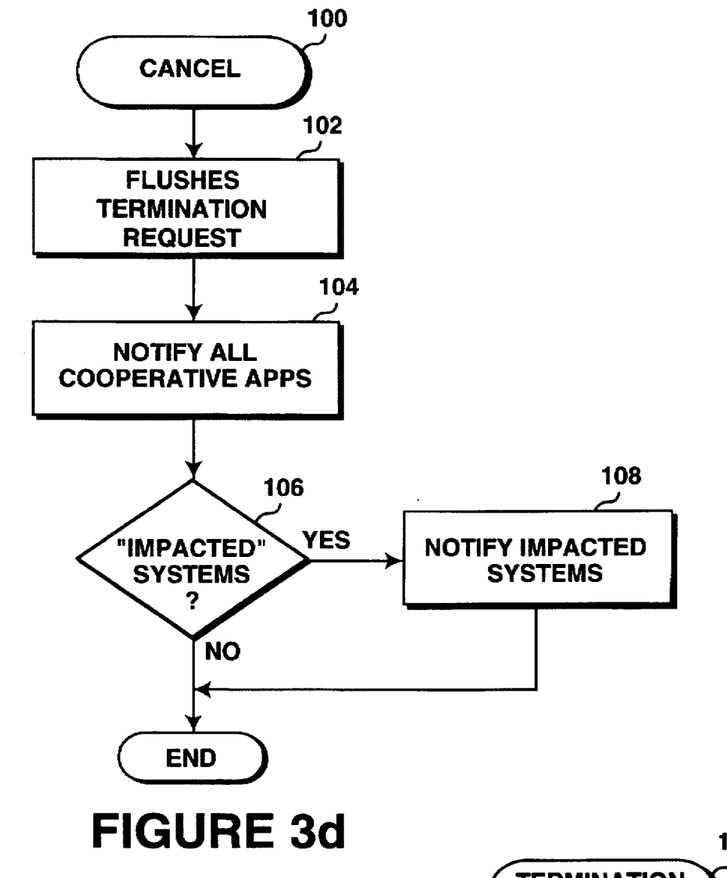

As shown in FIG. 3d, upon receipt of a cancel command from the user, step 100, conference manager 26 "flushes" the termination request, step 102. Next, conference manager 26 notifies all cooperative application 28 (if any) on the system, step 104. Then, conference manager 26 determines if it has previously notified other conferencing systems (i.e. those who are "impacted"), step 106. if there are no previously notified system, conference manager 26 takes no further action, otherwise, conference manager 26 notifies the "impacted" systems (if any) of the cancellation, step 108.

Figure 3E:
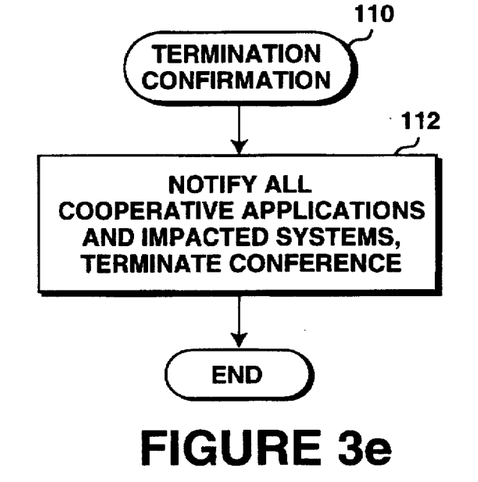

Lastly, as shown in FIG. 3e, upon receipt of a termination confirmation from the user, step 110, conference manager 26 notifies all cooperative applications (if any) and "impacted" systems (if any), and then terminates its connection to the conference, step 112.

Figure 4:
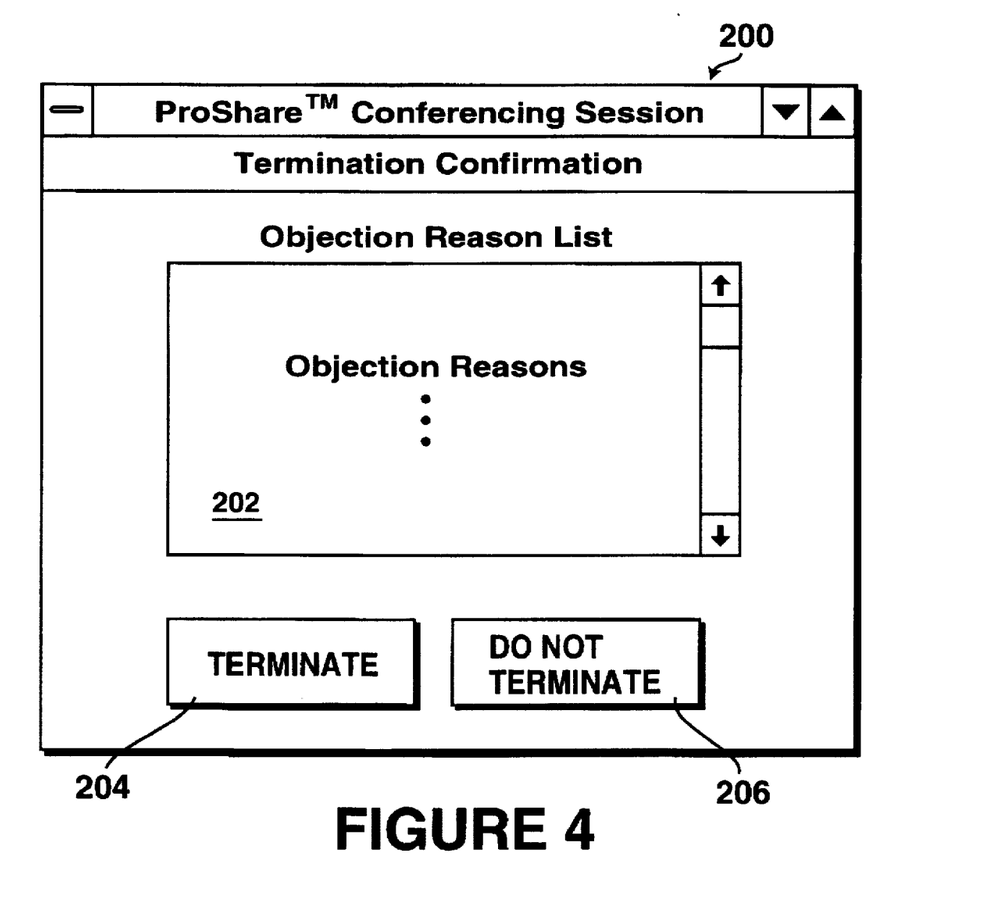
FIG. 4 illustrates one embodiment of a confirmation dialog box employed by the conference manager of FIG. 2 for providing the user with a choice on whether to proceed with the termination request or not.

FIG. 4 illustrates one embodiment of the confirmation dialog box employed to solicit inputs from the user on whether to proceed with a termination request or not. As shown, confirmation dialog box 200 includes area 202 for displaying the objection reasons received by conference manager 26 from local cooperative applications 28 or from the other systems joined to the conference. Additionally, confirmation dialog box 200 includes command button 204 for confirming the termination request, overriding the objections, and command button 206 for canceling the termination request, sustaining the objections. The user may select either command button 204 or 206. It is expected that the user will make his/her decision based on the objection reasons given and/or from whom the objections were raised.

Thus, a method and apparatus for conditionally terminating a PC conference has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A personal computer (PC) conferencing system comprising a conferencing application having a conference manager for managing a conference in progress with one or more other conferencing systems, and at least one cooperative application utilizing the conferencing application for conferencing service, the conference manager having conference termination service that provides the at least one cooperative application with an opportunity to object to a conference termination request before servicing the conference termination request.

2. The PC conferencing system as set forth in claim 1, wherein the conference termination service notifies each of the at least one cooperative application whenever a termination request is received.

3. The PC conferencing system as set forth in claim 2, wherein the conference termination service further sets a timer to expire upon elapse of a predetermined time interval, after notifying each of the at least one cooperative application.

4. The PC conferencing system as set forth in claim 2, wherein each of the at least one cooperative application is equipped to reply to the conference termination request notification.

5. The PC conferencing system as set forth in claim 4, wherein each of the at least one cooperative application is equipped to reply to the conference termination request notification with a null reply message if the particular cooperative application does not object to terminating the conference in progress or a reply message with objection reason(s) if the particular cooperative application objects to terminating the conference in progress.

6. The PC conferencing system as set forth in claim 1, wherein the conference termination service further provides a user of the conferencing system with an opportunity to either override or sustain the objections received.

7. The PC conferencing system as set forth in claim 6, wherein the conference termination service displays a confirmation dialog box including a display area for displaying received objections, and a plurality of command buttons for the user to communicate to the conference termination service the user's desire to override or sustain the received objections.

8. The PC conferencing system as set forth in claim 1, wherein the conference termination service also provides the other conferencing systems with opportunities to object to the conference termination request if the other conferencing systems are connection dependent on the PC conferencing system.

9. The PC conferencing system as set forth in claim 8, wherein the conference termination service notifies each of the connection dependent conferencing systems whenever a conference termination request is received from a local source.

10. The PC conferencing system as set forth in claim 9, wherein the conference termination service further sets a timer to expire upon elapse of a predetermined time interval, after notifying each of the connection dependent conferencing systems.

11. The PC conferencing system as set forth in claim 9, wherein conference managers of conferencing applications of the connection dependent conferencing systems are equipped to reply to the conference termination notifications.

12. The PC conferencing system as set forth in claim 11, wherein conference managers of conferencing applications of the connection dependent conferencing systems are equipped to reply with null reply messages if the particular other conferencing systems do not object to the conference termination request or to reply with reply messages with objection reasons if the particular other conferencing systems object to the conference termination request.

13. In a personal computer (PC) conference, a method for conditionally terminating a conference in progress, the method comprising the steps of:

a) notifying a first cooperative application by a first conference manager of a first PC conferencing system of a conference terminating request received by the first conference manager for terminating the conference in progress; and b) conditionally terminating the conference in progress by the first conference manager depending on whether the first conference manager received a reply from the first cooperative application, and if the first conference manager received a reply from the first cooperative application, whether the first cooperative application objects to the conference termination request, and if the first cooperative application objects to the conference termination request, whether a user of the first PC conferencing system prefers to override or sustain the first cooperative application's objection.

14. The method as set forth in claim 13, wherein step (a) further comprises setting a timer to expire upon elapse of a first predetermined time interval by the first conference manager after notifying the first cooperative application of the conference terminating request.

15. The method as set forth in claim 13, wherein step (b) comprises step (b.1) replying by the first cooperative application to the first conference manager on whether the first cooperative application objects or does not object to the conference termination request.

16. The method as set forth in claim 15, wherein step (b.1) comprises replying a null message by the first cooperative application to the first conference manager if the first cooperative application does not does not object to the conference termination request, or replying a message with objection reason(s) by the first cooperative application to the first conference manager if the first cooperative application objects to the conference termination request.

17. The method as set forth in claim 15, wherein if the first cooperative application replies with an objection to the conference terminating request, step (b) further comprises step (b.2) soliciting inputs from a first user of the first conferencing system by the first conference manager on whether the first user prefers the first cooperative application's objection be overridden or be sustained.

18. The method as set forth in claim 17, wherein step (b.2) comprises displaying a confirmation dialog box for the user by the first conference manager, the confirmation dialog box including the first cooperative application's objection, and a plurality of command buttons for the user to select to communicate to the first conference manager the user's preference on whether the first cooperative application's objection is to be overridden or sustained.

19. The method as set forth in claim 13, wherein step (a) further comprises notifying a second conferencing system of the conference termination request, the second conferencing system being a connection dependent conferencing system of the first conferencing system.

20. The method as set forth in claim 13, wherein step (b) further comprises replying by the second conferencing system to the first conference manager on whether the second conferencing system objects or does not object to the conference termination request.

* * * * *